US011886281B2

(12) United States Patent
Kolar et al.

(10) Patent No.: US 11,886,281 B2
(45) Date of Patent: Jan. 30, 2024

(54) ARTIFICIAL INTELLIGENCE ENGINE PROVIDING AUTOMATED ERROR RESOLUTION

(71) Applicant: Bank of America Corporation, Charlotte, NC (US)

(72) Inventors: Prashanth Kolar, San Francisco, CA (US); Vetrivel Murugan Shanmuga Ganapathy, San Francisco, CA (US); Chirag B. Bhavsar, San Francisco, CA (US); Pavan Chayanam, Alamo, CA (US)

(73) Assignee: Bank of America Corporation, Charlotte, NC (US)

( * ) Notice: Subject to any disclaimer, the term of this patent is extended or adjusted under 35 U.S.C. 154(b) by 173 days.

(21) Appl. No.: 17/401,485

(22) Filed: Aug. 13, 2021

(65) Prior Publication Data

US 2023/0047437 A1 Feb. 16, 2023

(51) Int. Cl.
*G06F 11/07* (2006.01)
*G06N 20/00* (2019.01)

(52) U.S. Cl.
CPC ...... *G06F 11/0793* (2013.01); *G06F 11/0769* (2013.01); *G06N 20/00* (2019.01)

(58) Field of Classification Search
CPC ............ G06F 11/0793; G06F 11/0769; G06F 11/0787; G06F 11/0709; G06F 2201/81; G06N 20/00
See application file for complete search history.

(56) References Cited

U.S. PATENT DOCUMENTS

| 5,673,390 | A | * | 9/1997 | Mueller | G06F 11/327 |
| | | | | | 714/E11.187 |
| 6,754,181 | B1 | * | 6/2004 | Elliott | H04L 65/1101 |
| | | | | | 370/252 |
| 6,915,454 | B1 | * | 7/2005 | Moore | G06F 11/0709 |
| | | | | | 717/124 |
| 9,070,247 | B2 | | 6/2015 | Kuhn et al. | |
| 9,172,747 | B2 | | 10/2015 | Walters et al. | |
| 9,202,171 | B2 | | 12/2015 | Kuhn | |
| 10,706,705 | B2 | | 7/2020 | Holt | |
| 10,762,640 | B2 | | 9/2020 | Mudretsov et al. | |

(Continued)

*Primary Examiner* — Matthew M Kim
*Assistant Examiner* — Matthew N Putaraksa
(74) *Attorney, Agent, or Firm* — Banner & Witcoff, Ltd.

(57) ABSTRACT

Aspects of the disclosure relate to automated error processing. A computing platform may receive historical error/solution information. The computing platform may train, using the historical error/solution information, an artificial intelligence engine to automatically identify solutions for current errors for a plurality of users. The computing platform may identify current errors for a user of the plurality of users. The computing platform may notify the user of the current errors. The computing platform may receive a request to correct an error of the one or more current errors. The computing platform may identify, using the artificial intelligence engine, a solution to the error. The computing platform may automatically perform actions to achieve the solution. The computing platform may send, after performing the actions, commands directing an event processing system to process an event with which the error was associated, which may cause the event processing system to process the event.

18 Claims, 11 Drawing Sheets

(56) References Cited

U.S. PATENT DOCUMENTS

| | | | |
|---|---|---|---|
| 10,795,749 B1* | 10/2020 | Fountain | G06F 11/079 |
| 10,803,479 B2 | 10/2020 | Brigham et al. | |
| 10,838,779 B1 | 11/2020 | Yue et al. | |
| 10,861,442 B2 | 12/2020 | Manoharan et al. | |
| 10,891,219 B1* | 1/2021 | Dimitropoulos | A63F 13/352 |
| 10,956,480 B2 | 3/2021 | Beaumont et al. | |
| 10,990,248 B1 | 4/2021 | Yue et al. | |
| 11,009,970 B2 | 5/2021 | Hindi et al. | |
| 11,010,127 B2 | 5/2021 | Orr et al. | |
| 11,010,656 B2 | 5/2021 | Mars et al. | |
| 11,024,304 B1 | 6/2021 | Smith | |
| 11,031,001 B1 | 6/2021 | Cheng et al. | |
| 11,042,800 B2 | 6/2021 | Mars et al. | |
| 11,064,006 B2 | 7/2021 | Eraslan et al. | |
| 11,082,559 B1 | 8/2021 | Koneru et al. | |
| 11,087,759 B2 | 8/2021 | Lemay et al. | |
| 11,087,765 B2 | 8/2021 | Leong | |
| 11,305,886 B1* | 4/2022 | Gilbert | B64D 43/00 |
| 2010/0185905 A1* | 7/2010 | Brugler | G06F 11/0769 714/57 |
| 2014/0109050 A1* | 4/2014 | Gibbens | G06F 11/368 717/124 |
| 2018/0132735 A1* | 5/2018 | Weebadde | A61B 5/0006 |
| 2018/0189130 A1* | 7/2018 | Mowry | G06F 11/0784 |
| 2019/0146862 A1* | 5/2019 | Kephart | G06F 11/0709 714/2 |
| 2019/0171633 A1* | 6/2019 | Demla | G06F 16/2358 |
| 2019/0227787 A1* | 7/2019 | Kumar | G06F 8/71 |
| 2020/0280573 A1* | 9/2020 | Johnson | G06N 20/00 |
| 2020/0372105 A1* | 11/2020 | Gerges | G06F 40/232 |
| 2021/0255914 A1* | 8/2021 | Ciabarra, Jr. | G06F 11/079 |
| 2021/0357939 A1* | 11/2021 | Davis | G06F 11/3476 |
| 2022/0083409 A1* | 3/2022 | Lee | G06F 11/0751 |
| 2022/0291990 A1* | 9/2022 | Iyer | B25J 9/163 |
| 2022/0308990 A1* | 9/2022 | DeLuca | G06F 11/0793 |

* cited by examiner

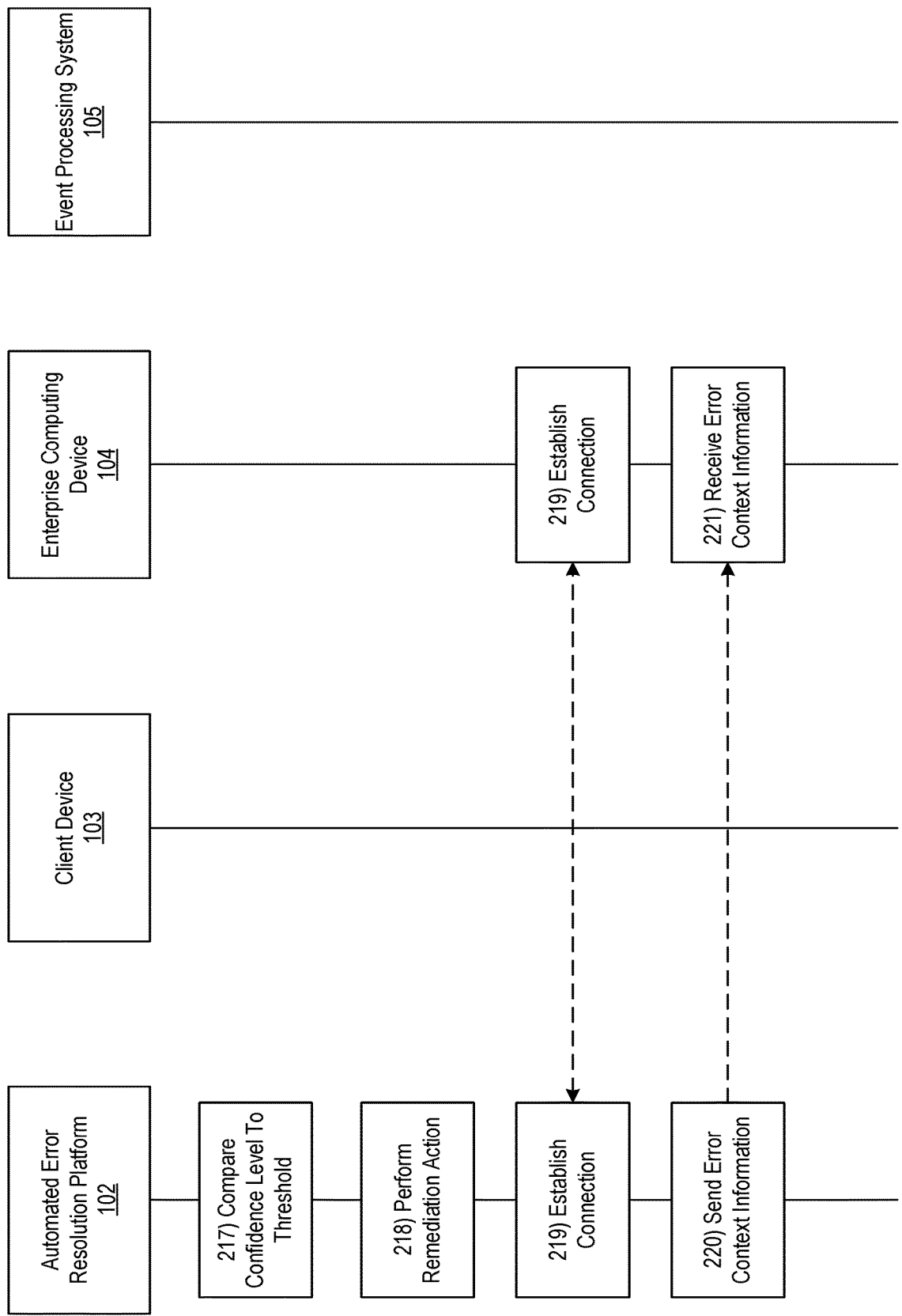

405

Error List

1. Error #1 (3PM)
2. Error #2 (12PM)
3. Error #3 (10AM)

Would you like assistance with Error #1?

Error Information Interface

The identified error is: Error #1.

Mitigating steps performed:
    Action #1
    Action #2

FIG. 5

ARTIFICIAL INTELLIGENCE ENGINE PROVIDING AUTOMATED ERROR RESOLUTION

BACKGROUND

Aspects of the disclosure relate to automated error resolution. In some cases, customers may contact a call center and/or use an interactive voice response system to have their account problems addressed by an agent or employee. In some instances, however, it may be time consuming for both the customer and the agent to solve such problems. Additionally, customers across an enterprise may experience a significant number of different errors, and a human representative may be incapable of seeing/experiencing each error and learning how to solve them. As a result, there may be processing delays and/or shortcomings associated with error resolution, which may lead to poor customer satisfaction.

SUMMARY

Aspects of the disclosure provide effective, efficient, scalable, and convenient technical solutions that address and overcome the technical problems associated with error processing. In accordance with one or more embodiments of the disclosure, a computing platform comprising at least one processor, a communication interface, and memory storing computer-readable instructions may receive historical error and solution information. The computing platform may train, using the historical error and solution information, an artificial intelligence engine, where training the artificial intelligence engine enables it to automatically identify solutions for current errors for a plurality of users. The computing platform may identify one or more current errors for a user of the plurality of users. The computing platform may notify the user of the one or more current errors. The computing platform may receive a request to correct an error of the one or more current errors. The computing platform may identify, using the artificial intelligence engine, a solution to the error. The computing platform may automatically perform one or more actions to achieve the solution. The computing platform may send, after performing the one or more actions, one or more commands directing an event processing system to process an event with which the error was associated, which may cause the event processing system to process the event.

In one or more instances, the historical error and solution information may be information indicating technical problems experienced during interaction with a mobile application or online portal. In one or more instances, identifying the one or more current errors for the user may include receiving a user input indicating the one or more current errors.

In one or more examples, identifying the one or more current errors for the user may include identifying, automatically and without receiving a user input from the user indicating the one or more current errors, the one or more current errors. In one or more examples, notifying the user of the one or more errors may include sending an out of band notification to the user indicating the one or more current errors.

In one or more instances, notifying the user of the one or more errors may include: 1) receiving a log in request from the user to access an account, and 2) displaying, along with a home page for the account, the one or more errors. In one or more instances, receiving the request to correct the error of the one or more current errors may include: 1) prompting the user to provide input indicating whether or not a most current error of the one or more current errors should be addressed; and 2) receiving input indicating that the most current error should be addressed.

In one or more examples, identifying the solution may include automatically identifying the solution using the artificial intelligence engine, and identifying the solution further includes: 1) generating, using the artificial intelligence engine, a confidence score corresponding to the automatically identified solution; 2) based on identifying that the confidence score exceeds a first threshold, automatically performing one or more actions to achieve the solution; 3) based on identifying that the confidence score exceeds a second threshold but not the first threshold, sending a notification of the one or more actions for approval by the user; and 4) based on identifying that the confidence score does not exceed the second threshold, routing the error to an enterprise computing device for further assistance. In one or more examples, routing the error to the enterprise computing device may further include generating a report that includes the error and a list of mitigation steps performed.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2G depict an illustrative event sequence that implements an artificial intelligence engine for automated error resolution in accordance with one or more example embodiments;

FIGS. 4 and 5 depict illustrative graphical user interfaces that implement an artificial intelligence engine for automated error resolution in accordance with one or more example embodiments.

DETAILED DESCRIPTION

Figure 1A:
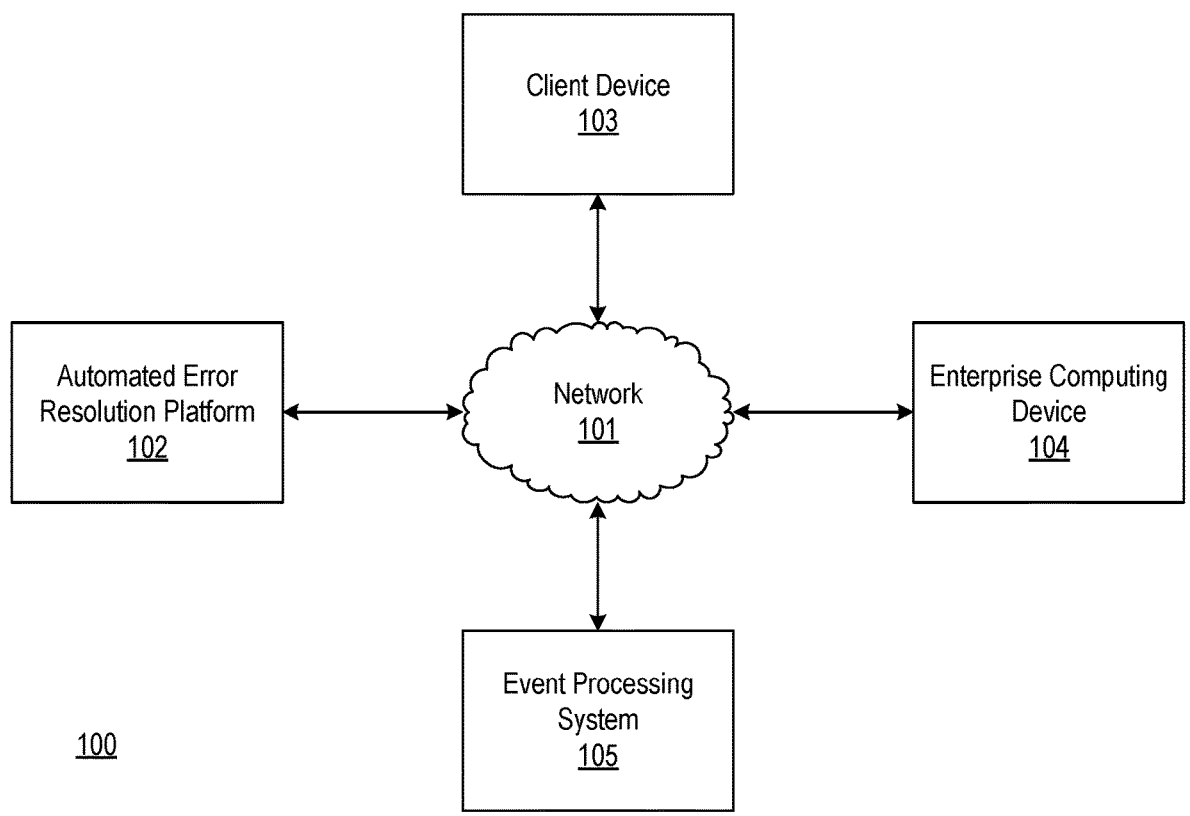
FIGS. 1A-1B depict an illustrative computing environment that implements an artificial intelligence engine for automated error resolution in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure relate to automated error resolution and processing. For example, customers may currently call a customer service line (e.g., 1-800 number) to resolve problems with their mobile activity. To do so, they may go through a series of questions and options using an interactive voice response (IVR) system before they get the answer from a live agent. The agent may provide the solution based on technical documentation provided by an engineering team, which may consume both time and effort for customers and agents.

Most of the questions may relate to failed transactions, mobile payment applications, bill pay failure, adding a digital debit card to the digital wallet, and/or other actions. If an artificial intelligence (AI) system can be built that may scan through customer transaction logs, proactively display the recent failed transactions and provide customized solutions, it may save a lot of time, effort, and call center resources, which may therefore increase customer satisfaction.

Accordingly, a solution is described that includes designing/building an AI engine to scan the user activity, identify the issues customers are experiencing, and provide solutions to context based customer failed transactions. An AI engine for identifying the patterns from the user activity (e.g., mobile payment transfers, bill pay, fraud activity, digital debit card, check deposit, and/or other activities) and making them available to a customer. The AI engine may display the list of specific issues identified for the customer profile by scanning and searching activity logs. The AI integrated system may present the resolution options that a customer may go through and resolve themselves without talking to an agent.

An AI system is described herein that mines user activity, identifies user transaction issues, and lists the issues customers have experienced based on context. In some instances, an option to resolve the issue without talking to a live agent and/or an option to talk to a specific contact center agent may be provided. As a result, machine learning (ML) and/or natural language processing (NLP) may be used to process and identify the issues from the transaction logs. Additionally, questions may be dynamically answered specific to a user through a series of steps that would otherwise be provided by a call center agent. Furthermore, an interface may be provided in which a dial option (e.g., press 2) routes a customer to a particular agent.

These and other features are described in further detail below.

Figure 1B:
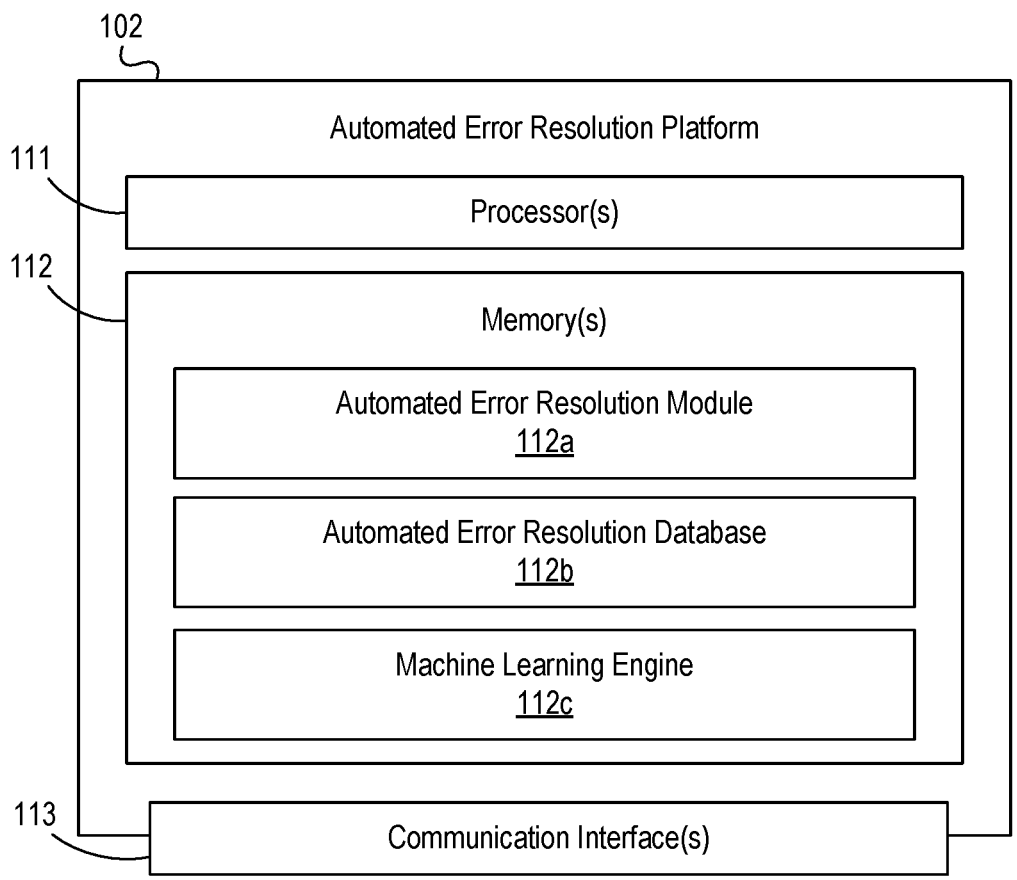

FIGS. 1A-1B depict an illustrative computing environment that implements an artificial intelligence engine for automated error resolution in accordance with one or more example embodiments. Referring to FIG. 1A, computing environment 100 may include one or more computer systems. For example, computing environment 100 may include an automated error resolution platform 102, a client device 103, an enterprise computing device 104, and an event processing system 105.

As described further below, automated error resolution platform 102 may be a computer system that includes one or more computing devices (e.g., servers, server blades, or the like) and/or other computer components (e.g., processors, memories, communication interfaces) that may be used to train, host, and/or otherwise maintain an artificial intelligence engine that may be configured to automatically identify solutions to customer problems.

Client device 103 may be a laptop computer, desktop computer, mobile device, tablet, smartphone, and/or other device that may be used by an individual to access an account, perform one or more account activities, and/or specify one or more account issues. In some instances, client device 103 may be configured to display one or more user interfaces (e.g., account home pages, error lists, customer assistance chats, or the like).

Enterprise computing device 104 may be a laptop computer, desktop computer, mobile device, tablet, smartphone, and/or other device that may be used to provide manual error resolution information (e.g., as input by an employee of, for example, a financial institution). In some instances, enterprise computing device 104 may be configured to display one or more user interfaces (e.g., customer assistance chats, assistance logs/reports, and/or other interfaces).

Event processing system 105 may be or include one or more computing devices (servers, server blades, or the like) configured to process one or more events (e.g., transactions, trades, deposits, withdrawals, fund transfers, exchanges, and/or other events). For example, the event processing system 105 may be maintained or otherwise managed by a financial institution, and may be configured to process previously problematic or otherwise error prone events after the corresponding errors have been remediated.

Computing environment 100 also may include one or more networks, which may interconnect automated error resolution platform 102, client device 103, enterprise computing device 104, and/or event processing system 105. For example, computing environment 100 may include a network 101 (which may interconnect, e.g., automated error resolution platform 102, client device 103, enterprise computing device 104, and/or event processing system 105).

In one or more arrangements, automated error resolution platform 102, client device 103, enterprise computing device 104, and/or event processing system 105 may be any type of computing device capable of sending and/or receiving requests and processing the requests accordingly. For example, automated error resolution platform 102, client device 103, enterprise computing device 104, event processing system 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of automated error resolution platform 102, client device 103, enterprise computing device 104, and/or event processing system 105 may, in some instances, be special-purpose computing devices configured to perform specific functions.

Referring to FIG. 1B, automated error resolution platform 102 may include one or more processors 111, memory 112, and communication interface 113. A data bus may interconnect processor 111, memory 112, and communication interface 113. Communication interface 113 may be a network interface configured to support communication between automated error resolution platform 102 and one or more networks (e.g., network 101, or the like). Memory 112 may include one or more program modules having instructions that when executed by processor 111 cause automated error resolution platform 102 to perform one or more functions described herein and/or one or more databases that may store and/or otherwise maintain information which may be used by such program modules and/or processor 111. In some instances, the one or more program modules and/or databases may be stored by and/or maintained in different memory units of automated error resolution platform 102 and/or by different computing devices that may form and/or otherwise make up automated error resolution platform 102. For example, memory 112 may have, host, store, and/or include automated error resolution module 112*a*, automated error resolution database 112*b*, and/or machine learning engine 112*c*.

Automated error resolution module 112a may have instructions that direct and/or cause automated error resolution platform 102 to train, maintain, and implement an artificial intelligence engine for automated error resolution, as discussed in greater detail below. Automated error resolution database 112b may store information used by automated error resolution module 112a and/or automated error resolution platform 102 in application of advanced techniques to automatically perform error resolution, and/or in performing other functions. Machine learning engine 112c may comprise or otherwise be used by the artificial intelligence engine to provide automated error resolution and/or to iteratively refine and/or otherwise optimize datasets and/or algorithms that may be used to provide such automated error resolution.

Figure 2A:
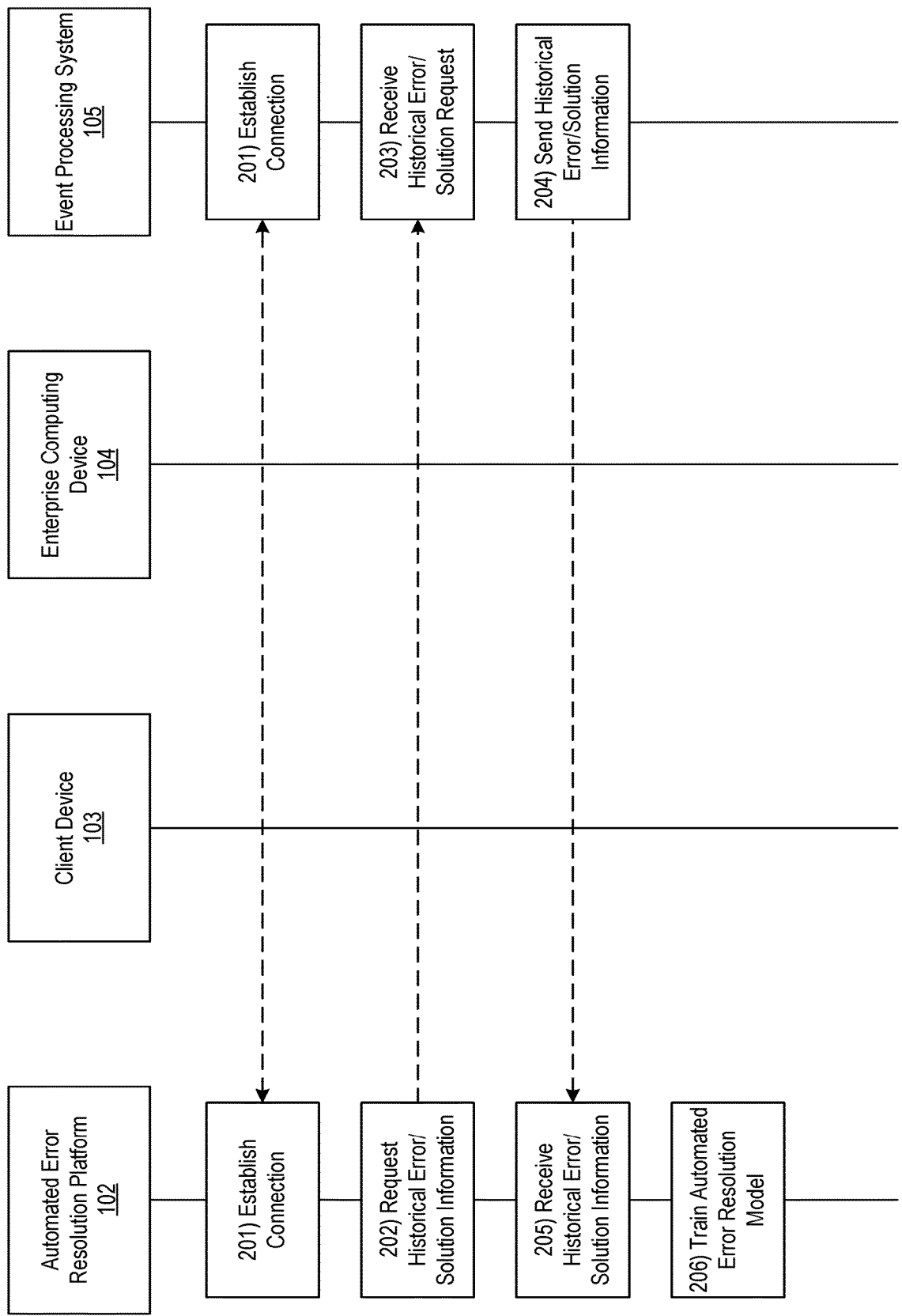

FIGS. 2A-2G depict an illustrative event sequence that implements an artificial intelligence engine for automated error resolution in accordance with one or more example embodiments. Referring to FIG. 2A, at step 201, the automated error resolution platform 102 may establish a connection with the event processing system 105. For example, the automated error resolution platform 102 may establish a first wireless data connection with the event processing system 105 to link the automated error resolution platform 102 to the event processing system 105 (e.g., in preparation for requesting historical error/solution information). In some instances, the automated error resolution platform 102 may identify whether or not a connection is already established with the event processing system 105. If a connection is already established with the event processing system 105, the automated error resolution platform 102 might not re-establish the connection. If a connection is not yet established with the event processing system 105, the automated error resolution platform 102 may establish the first wireless data connection as described herein.

At step 202, the automated error resolution platform 102 may send a request for historical error/solution information. For example, the automated error resolution platform 102 may send a request for information corresponding to previous errors and/or user queries/questions, and the identified solutions for these errors (e.g., what the error was, what the solution was, time information, frequency of the error, customer demographic information, and/or other information). In some instances, the automated error resolution platform 102 may send the request via the communication interface and while the first wireless data connection is established.

At step 203, the event processing system 105 may receive the historical error/solution request sent at step 202. For example, the event processing system 105 may receive the historical error/solution request while the first wireless data connection is established.

At step 204, the event processing system 105 may send historical error/solution information to the automated error resolution platform 102. For example, the event processing system 105 may send the historical error/solution information to the automated error resolution platform 102 while the first wireless data connection is established.

At step 205, the automated error resolution platform 102 may receive the historical error solution information sent at step 204. For example, the automated error resolution platform 102 may receive the historical error solution information via the communication interface 113 and while the first wireless data connection is established. In some instances, in receiving the historical error solution information, the automated error resolution platform 102 may receive information indicating technical problems experienced during interaction with a mobile application or online portal.

At step 206, the automated error resolution platform 102 may train an automated error resolution model (which may e.g., be an artificial intelligence engine) using the historical error/solution information. For example, the automated error resolution platform 102 may train the automated error resolution model to identify solutions to customer problems/errors using historical information indicating solutions that have satisfied/resolved various problems/errors in the past for customers of varied demographic circumstances (e.g., geographic regions, account balance, and/or other characteristics). As a particular example, the automated error resolution platform 102 may generate a model that includes all historical problems/errors encountered for customers that match each of a plurality of combinations of demographic characteristics (e.g., customers from Virginia who are between 30 and 40 years old). The automated error resolution platform 102 may store, along with these historical problems/errors, a successful solution that was achieved and the actions taken to perform the solution. For example, a particular error may be a failed attempt to deposit a check using a mobile banking application, and the solution may be to flatten out the check so as to remove wrinkles that may otherwise have obstructed check information. Along with these historical errors/solutions based on demographic information, the automated error resolution platform 102 may store numeric values indicating a number of the same type of problem that has been experienced for the corresponding demographic group. For example, the check deposit error may have been addressed 500 times, and thus the number 500 may be stored along with this problem for the corresponding demographic group. In some instances, the automated error resolution platform 102 may rank the problems/errors for each demographic group based on their frequency. Accordingly, by training the automated error resolution model in this way, the automated error resolution platform 102 may enable matching of future errors/problems/questions to those that have been previously addressed, and may thus identify a solution based on the match.

Figure 2B:
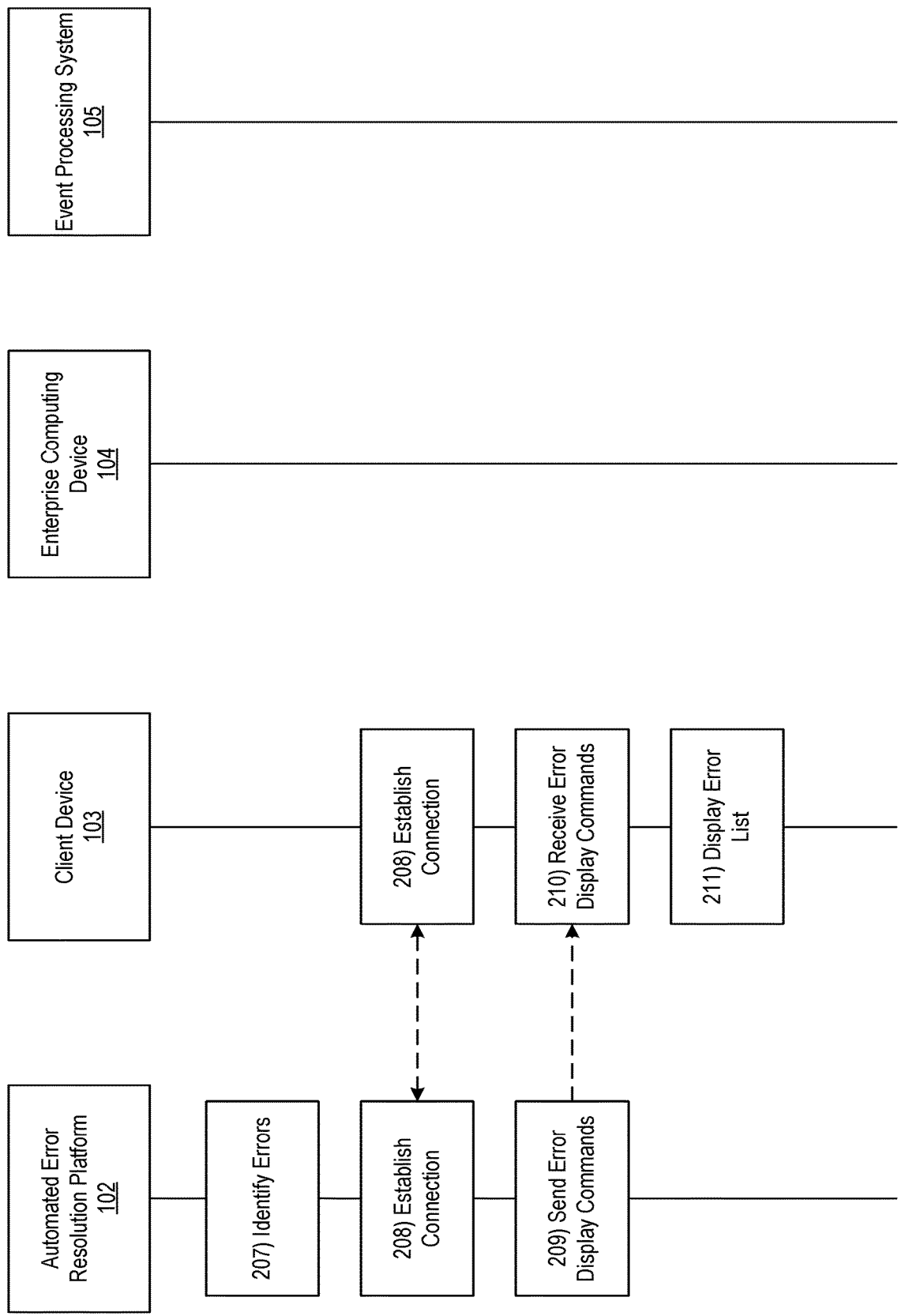

Referring to FIG. 2B, at step 207, the automated error resolution platform 102 may identify one or more errors. In some instances, the automated error resolution platform 102 may identify the one or more errors based on a user input received from a customer. For example, the customer may log into an online account or mobile banking application, and may specify a problem that they are experiencing (e.g., "I am having trouble depositing a check using the mobile application"). Additionally or alternatively, the automated error resolution platform 102 may automatically identify one or more errors experienced by the customer (e.g., based on a failed attempt to deposit a check, it may be identified that there is an error in depositing the check). In these instances, the automated error resolution platform 102 may perform such error identification in the background regardless of whether or not the customer is currently logged into an account. For example, the automated error resolution platform 102 may passively crawl transaction logs and/or other information to identify errors that the customer might not even be aware of. In some instances, in identifying the errors, the automated error resolution platform 102 may identify one or more errors, and may generate a list that includes the errors (which may, e.g., include timestamps corresponding to the errors, and may include the errors in a ranked list based on the timestamps). In some instances, in identifying the error, the automated error resolution platform 102 may identify one or more of: a failed transaction, failed fund transfer, failed withdrawal, failed deposit, mobile application/web portal errors, and/or other customer service errors for an enterprise organization (e.g., a financial institution).

At step 208, the automated error resolution platform 102 may establish a connection with client device 103. For example, the automated error resolution platform 102 may establish a second wireless data connection with the client device 103 to link the automated error resolution platform 102 to the client device 103 (e.g., in preparation for sending error display commands). In some instances, the automated error resolution platform 102 may identify whether or not a connection is already established with the client device 103. If a connection is already established with the client device 103, the automated error resolution platform 102 might not re-establish the connection. If a connection is not yet established with the client device 103, the automated error resolution platform 102 may establish the second wireless data connection as described herein.

At step 209, the automated error resolution platform 102 may send one or more commands directing the client device 103 to display the error list. In some instances, the automated error resolution platform 102 may send the one or more commands directing the client device 103 to display the error list via the communication interface 113 and while the second wireless data connection is established. In one or more instances, sending the one or more commands directing the client device 103 to display the error list comprises sending an out of band notification to the user indicating the one or more current errors (e.g., an email, text, and/or other notification). Additionally or alternatively, in sending the one or more commands directing the client device 103 to display the error list, the automated error resolution platform 102 may direct the client device 103 to display the error within a mobile application, web portal, and/or other service upon a successful login of the customer. For example, the automated error resolution platform 102 may direct the client device 103 to display the error list on a home screen or other page of the mobile application, web portal, or the like.

At step 210, the client device 103 may receive the one or more error display commands. For example, the client device 103 may receive the one or more error display commands while the second wireless data connection is established.

At step 211, based on or in response to the one or more commands directing the client device 103 to display the error list, the client device 103 may display the error list. For example, the client device 103 may display a graphical user interface (e.g., within an online portal, mobile application, or the like) similar to graphical user interface 405, which is shown in FIG. 4. In some instances, in displaying the graphical user interface, the client device 103 may display a ranked listing of errors based on timestamps, and may prompt the customer to request assistance with the most recent error.

Figure 2C:
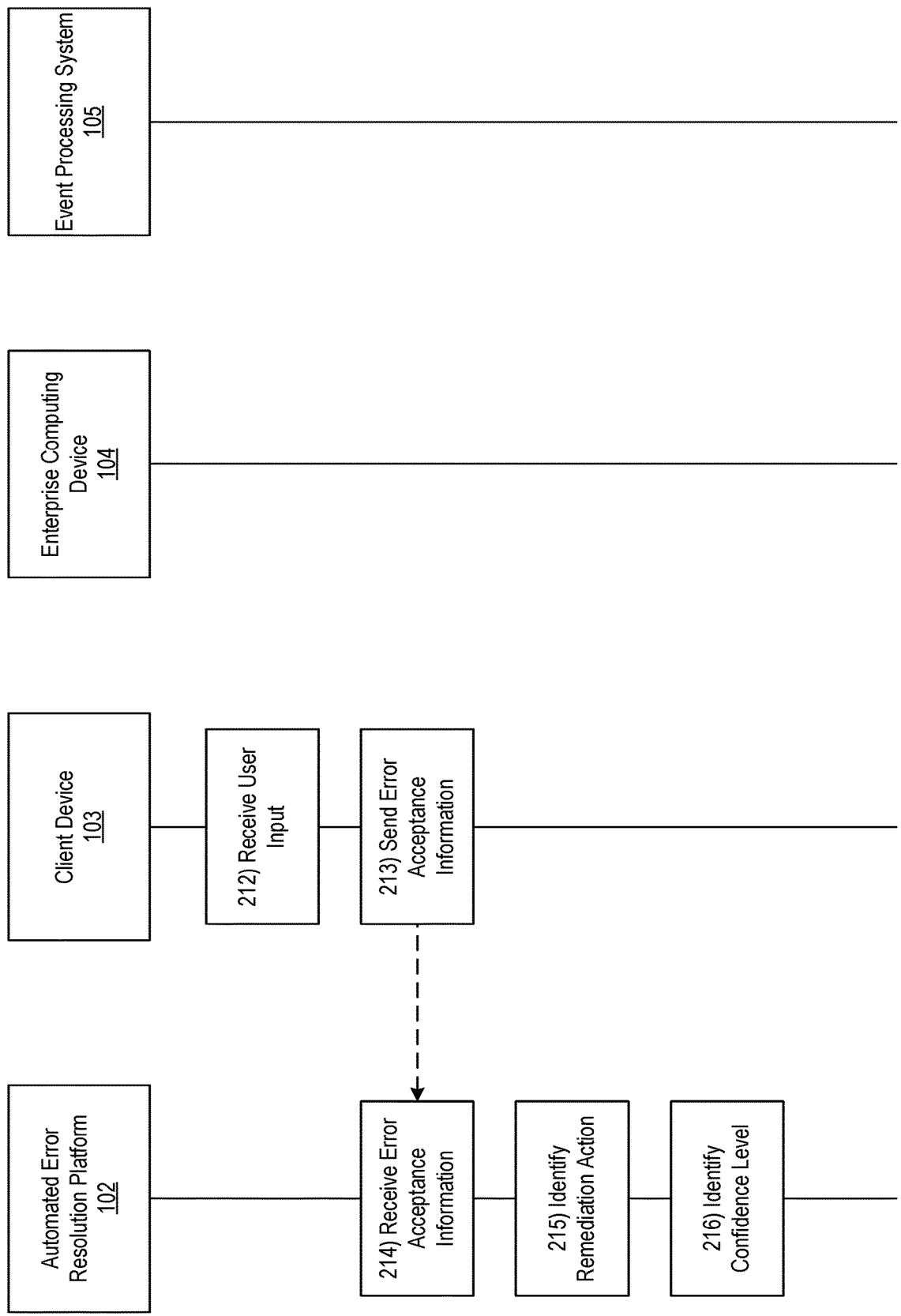

Referring to FIG. 2C, at step 212, the client device 103 may receive user input indicating which error on the list of errors should be addressed (if any). For example, the client device 103 may receive user input indicating that they would like assistance with "Error #1" (e.g., the most recent error). In some instances, in receiving the user input, the client device 103 may receive an input indicating that the customer would prefer to speak directly with an agent (e.g., "Press #2 if you'd like to speak directly with an agent"). In these instances, the client device 103 may proceed to step 219.

At step 213, the client device 103 may send error acceptance information to the automated error resolution platform 102 (e.g., indicating which error should be addressed). For example, the client device 103 may send the error acceptance information to the automated error resolution platform 102 while the second wireless data connection is established.

At step 214, the automated error resolution platform 102 may receive the error acceptance information sent at step 213. For example, the automated error resolution platform 102 may receive the error acceptance information via the communication interface 113 and while the second wireless data connection is established.

At step 215, the automated error resolution platform 102 may identify, using the automated error resolution model, one or more remediation actions (e.g., a solution) to address the error. For example, the automated error resolution platform 102 may identify whether or not the error has been previously solved (e.g., by comparing the error to the historical problem/solution information for a demographic corresponding to the customer). In some instances, if the automated error resolution platform 102 identifies that the error has not previously been solved, it may compare the error to historical problem/solution information for other demographic groups). In either case, if a match is identified, the automated error resolution platform 102 may identify the solution (and corresponding remediation actions) corresponding to the match.

If a match is not identified, the automated error resolution platform 102 may analyze the error using one or more natural language processing, natural language understanding, and/or other techniques to identify a context for the error, and subsequently identify whether or not a similar error has been previously processed. If a similar error has been processed, a solution for the similar error may be identified, and may be identified as a possible solution for the error.

At step 216, the automated error resolution platform 102 may identify a confidence score corresponding to the remediation action identified at step 215. For example, if the automated error resolution platform 102 identified an exact match between the current error and a historical error, the automated error resolution platform 102 may identify a higher confidence score than if the automated error resolution platform 102 identified a similar match or no match at all. If the automated error resolution platform 102 identified a similar or fuzzy match, a confidence score may be generated that is less than an exact match confidence level or score but higher than a no match confidence score. Similarly, if the automated error resolution platform 102 identified no match, a confidence score may be generated that is less than the exact match and the similar/fuzzy match confidence score.

Referring to FIG. 2D, at step 217, the automated error resolution platform 102 may compare the confidence score to one or more confidence thresholds. For example, the automated error resolution platform 102 may identify whether the confidence score meets or exceeds a first threshold. If so, the automated error resolution platform 102 may proceed to step 218 to automatically perform the remediation action (or automatically notify the customer of actions to perform). Otherwise, the automated error resolution platform 102 may identify whether the confidence score meets or exceeds a second threshold, lower than the first threshold. If so, the automated error resolution platform may still proceed to step 218, but may notify the customer of proposed actions to perform (e.g., the proposed remediation actions) and only perform them if acceptance is received from the customer. Otherwise, if the confidence score does not meet or exceed the second threshold, the automated error resolution platform 102 may proceed to step 219.

At step 218, the automated error resolution platform 102 may perform the remediation action(s) identified at step 215. For example, the automated error resolution platform 102 may automatically perform one or more actions to correct the error/problem (or notify the customer of steps to be manually performed). Additionally or alternatively, the automated error resolution platform 102 may notify the customer of the proposed remediation actions, and upon receiving an acceptance from the customer of those actions, the automated error resolution platform 102 may perform the one or more actions (or notify the customer of steps to be manually performed). The automated error resolution platform 102 may then proceed to step 225.

At step 219, the automated error resolution platform 102 may establish a connection with the enterprise computing device 104. For example, the automated error resolution platform 102 may establish a third wireless data connection with the enterprise computing device 104 to link the automated error resolution platform 102 to the enterprise computing device 104 (e.g., in preparation for sending error context information to the enterprise computing device 104). In some instances, the automated error resolution platform 102 may identify whether or not a connection is already established with the enterprise computing device 104. If a connection is already established with the enterprise computing device 104, the automated error resolution platform 102 might not re-establish the connection. If a connection is not yet established with the enterprise computing device 104, the automated error resolution platform 102 may establish the third wireless data connection as described herein.

At step 220, the automated error resolution platform 102 may generate and send error context information. For example, the automated error resolution platform 102 may generate a log that includes the identified error/problem and one or more attempted solutions (and/or any other information/context corresponding to the identified error/problem that may be helpful in identifying a solution). In some instances, the automated error resolution platform 102 may send the error context information to the enterprise computing device 104 via the communication interface 113 and while the third wireless data connection is established. In some instances, the automated error resolution platform 102 may also send one or more commands directing the enterprise computing device 104 to display the error context information.

At step 221, the enterprise computing device 104 may receive the error context information. For example, the enterprise computing device 104 may receive the error context information while the third wireless data connection is established. The enterprise computing device 104 may also receive the one or more commands directing the enterprise computing device 104 to display the error context information.

Figure 2E:
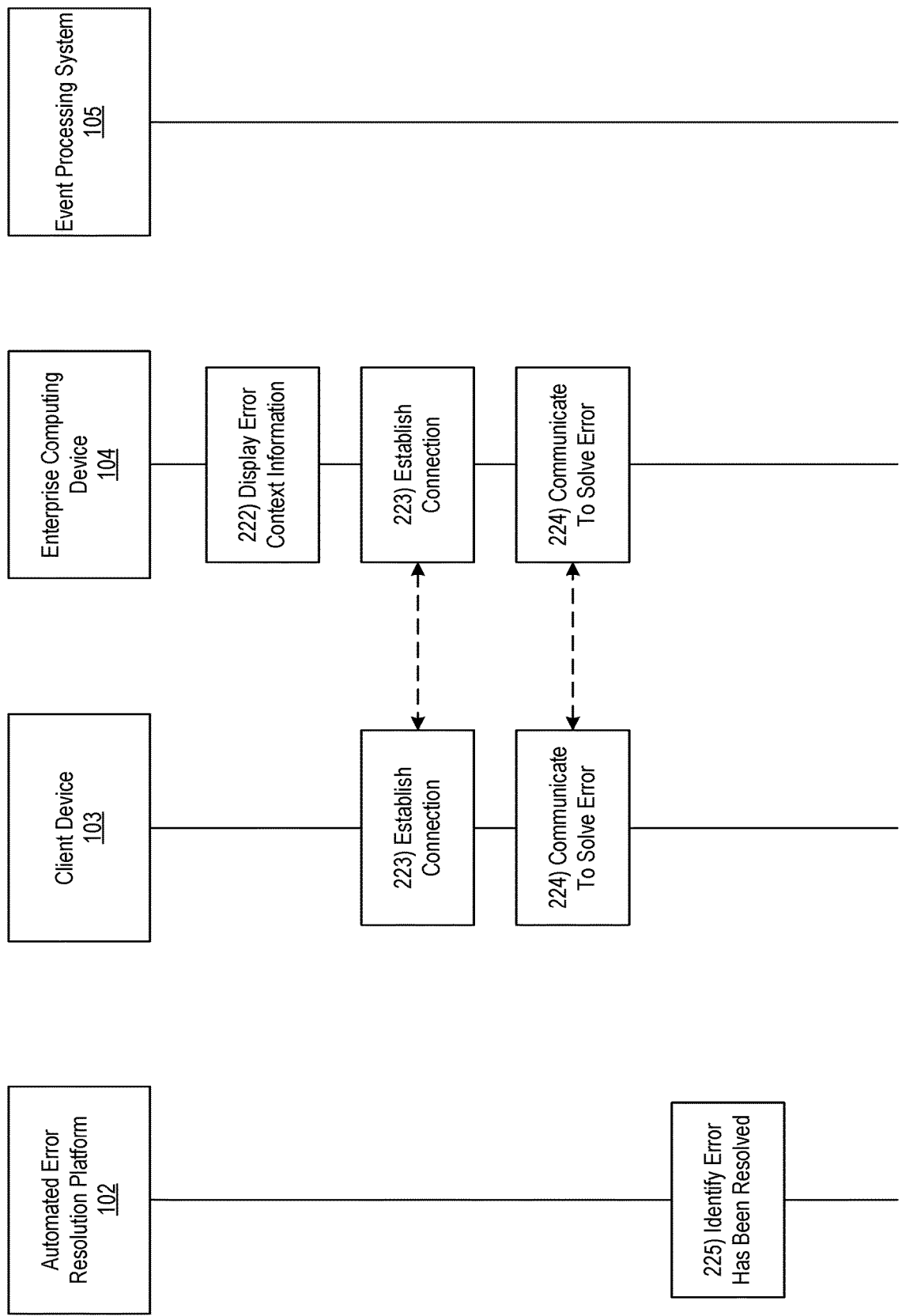

Referring to FIG. 2E, at step 222, based on or in response to the one or more commands directing the enterprise computing device 104 to display the error context information, the enterprise computing device 104 may display the error context information. For example, the enterprise computing device 104 may display a graphical user interface similar to graphical user interface 505, which is shown in FIG. 5. For example, the enterprise computing device 104 may display the identified error and one or more mitigating actions performed and/or other context information. In doing so, an administrator or other enterprise employee may be provided with context that may be used to more efficiently identify a solution in comparison to no contextual data at all or if merely unformatted log data were to be provided.

At step 223, the enterprise computing device 104 may establish a connection with client device 103. For example, the enterprise computing device 104 may establish a fourth wireless data connection with the client device 103 to link the enterprise computing device 104 to the client device 103 (e.g., for purposes of communicating to solve the error/problem). In some instances, the enterprise computing device 104 may identify whether or not a connection is already established with the client device 103. If a connection is already established with the client device 103, the enterprise computing device 104 might not re-establish the connection. If a connection is not yet established with the client device 103, the enterprise computing device 104 may establish the fourth wireless data connection as described herein.

At step 224, the enterprise computing device 104 may communicate with the client device 103 to solve the error. For example, the enterprise computing device 104 may initiate a chat interface and/or other communication channel with the client device 103 to facilitate a back and forth conversation between the customer and an enterprise employee to identify a solution to the error/problem.

At step 225, the automated error resolution platform 102 may identify that the error/problem has been resolved. For example, the automated error resolution platform 102 may automatically identify completion of one or more automated remediation actions and/or receive user confirmation that the error has been resolved.

Figure 2F:
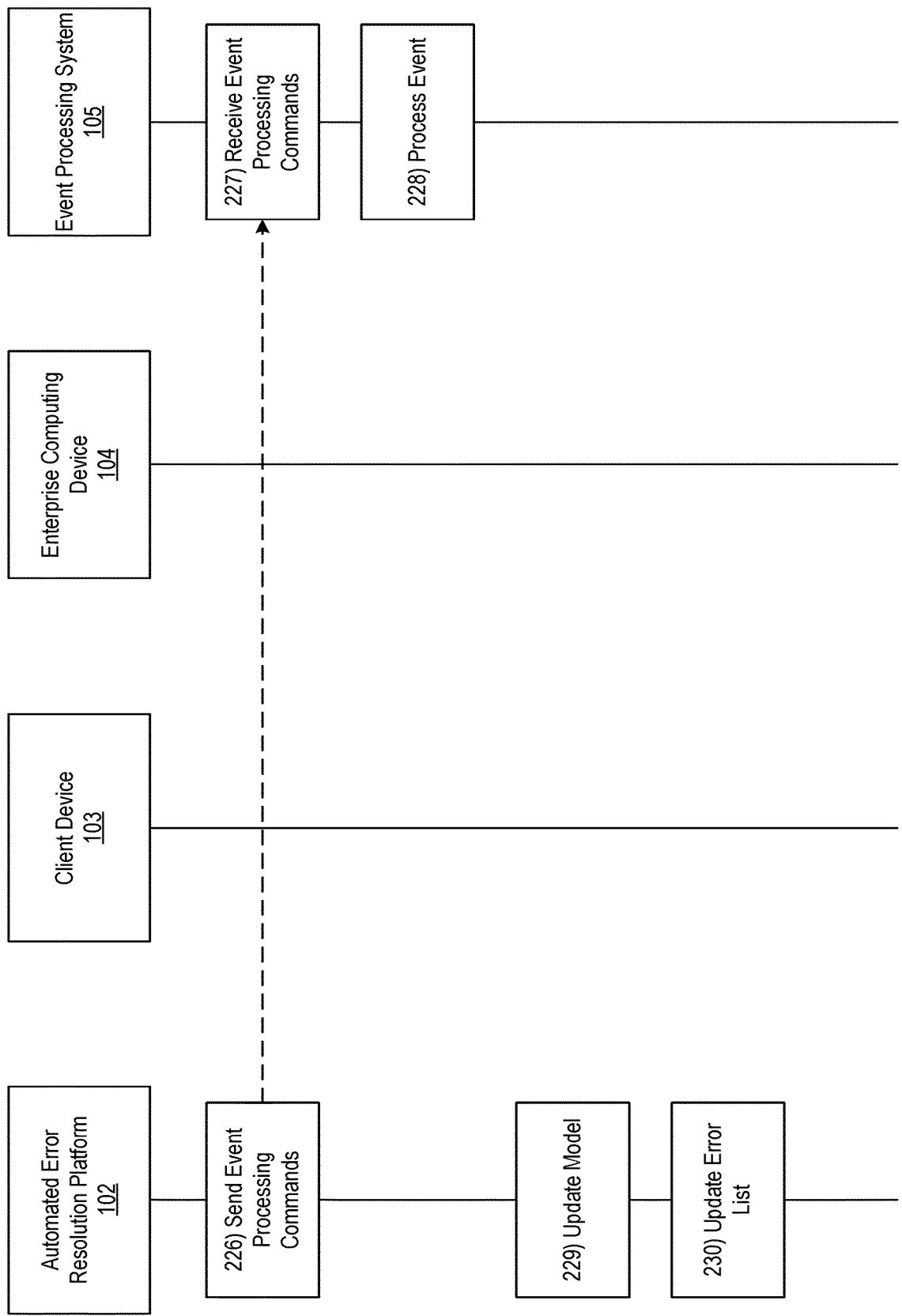

Referring to FIG. 2F, at step 226, the automated error resolution platform 102 may send one or more commands directing the event processing system 105 to process an event associated with the (now solved/remediated) problem/error. For example, the automated error resolution platform 102 may send one or more commands directing the event processing system 105 to execute a deposit, fund transfer, payment, withdrawal, and/or other event. For example, the automated error resolution platform 102 may send the one or more commands directing the event processing system 105 to process the event via the communication interface 113 and while the first wireless data connection is established.

At step 227, the event processing system 105 may receive the one or more event processing commands. For example, the event processing system 105 may receive the one or more event processing commands while the first wireless data connection is established.

At step 228, based on or in response to the one or more event processing commands, the event processing system 105 may process the event. For example, the event processing system 105 may execute a previously problematic or otherwise error prone event.

At step 229, the automated error resolution platform 102 may update the automated error resolution model. For example, based on the identified error/solution information and/or any user input received (e.g., from a customer at the client device 103 and/or an employee at the enterprise computing device 104), the automated error resolution platform 102 may update the automated error resolution model to further refine/dynamically update the automated error resolution model and increase accuracy with the model.

At step 230, the automated error resolution platform 102 may update the error list. For example, the automated error resolution platform 102 may update the error list so as to remove the error that has been addressed from the error list, thus leaving only errors that have not yet been addressed.

Figure 2G:
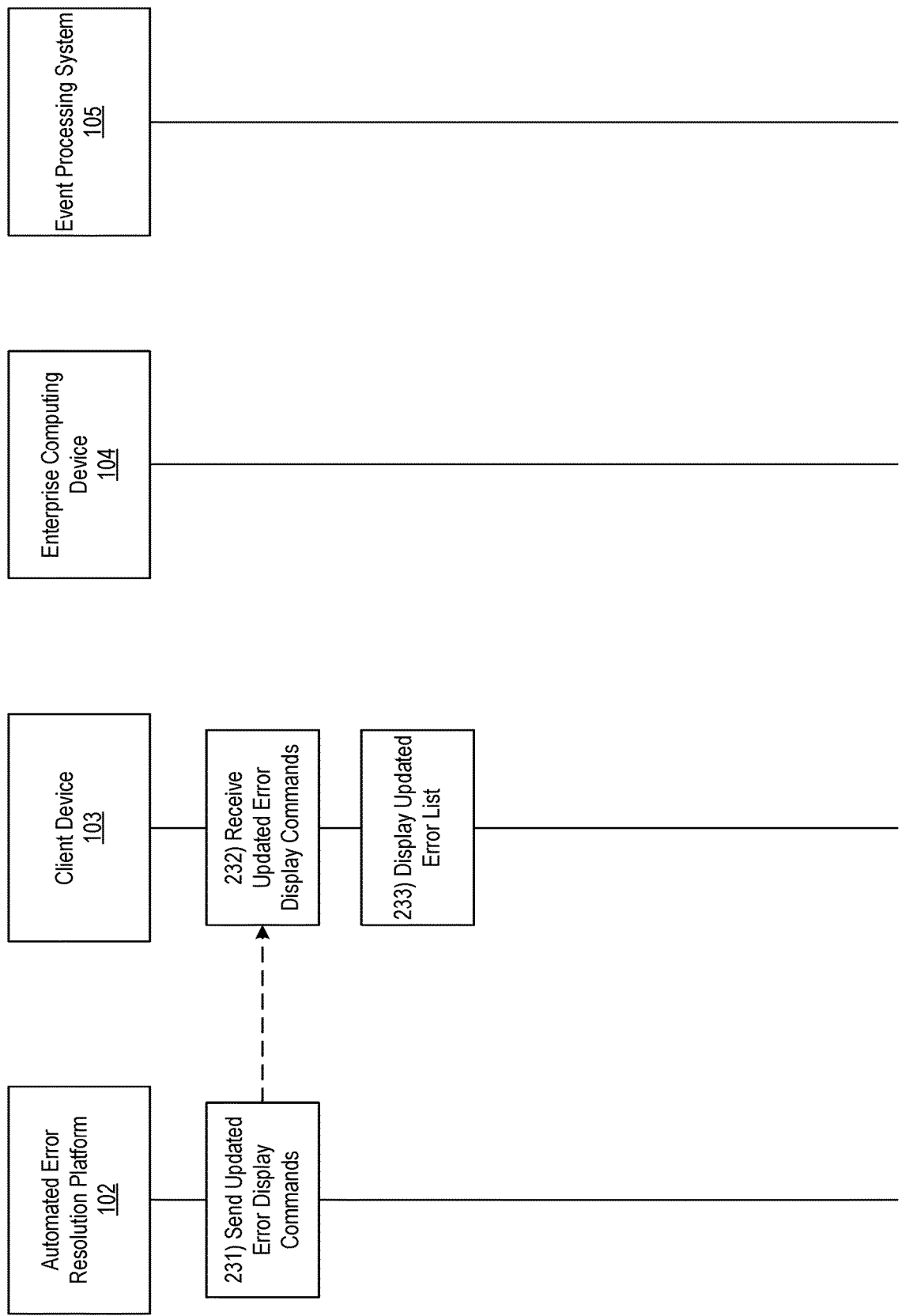

Referring to FIG. 2G, at step 231, the automated error resolution platform 102 may send one or more commands directing the client device 103 to display the updated error list. In some instances, the automated error resolution platform 102 may send the one or more commands directing the client device 103 to display the updated error list via the communication interface 113 and while the second wireless data connection is established.

At step 232, the client device 103 may receive the one or more commands directing the client device 103 to display the updated error list. For example, the client device 103 may receive the one or more commands directing the client device 103 to display the updated error list while the second wireless data connection is established.

At step 233, based on or in response to the one or more commands directing the client device 103 to display the updated error list, the client device 103 may display the updated error list. For example, the client device 103 may display a graphical user interface similar to graphical user interface 405, which is shown in FIG. 4, however, "Error #1," which may have been resolved/addressed as described above, may be removed, leaving only "Error #2" and "Error #3."

Figure 3:
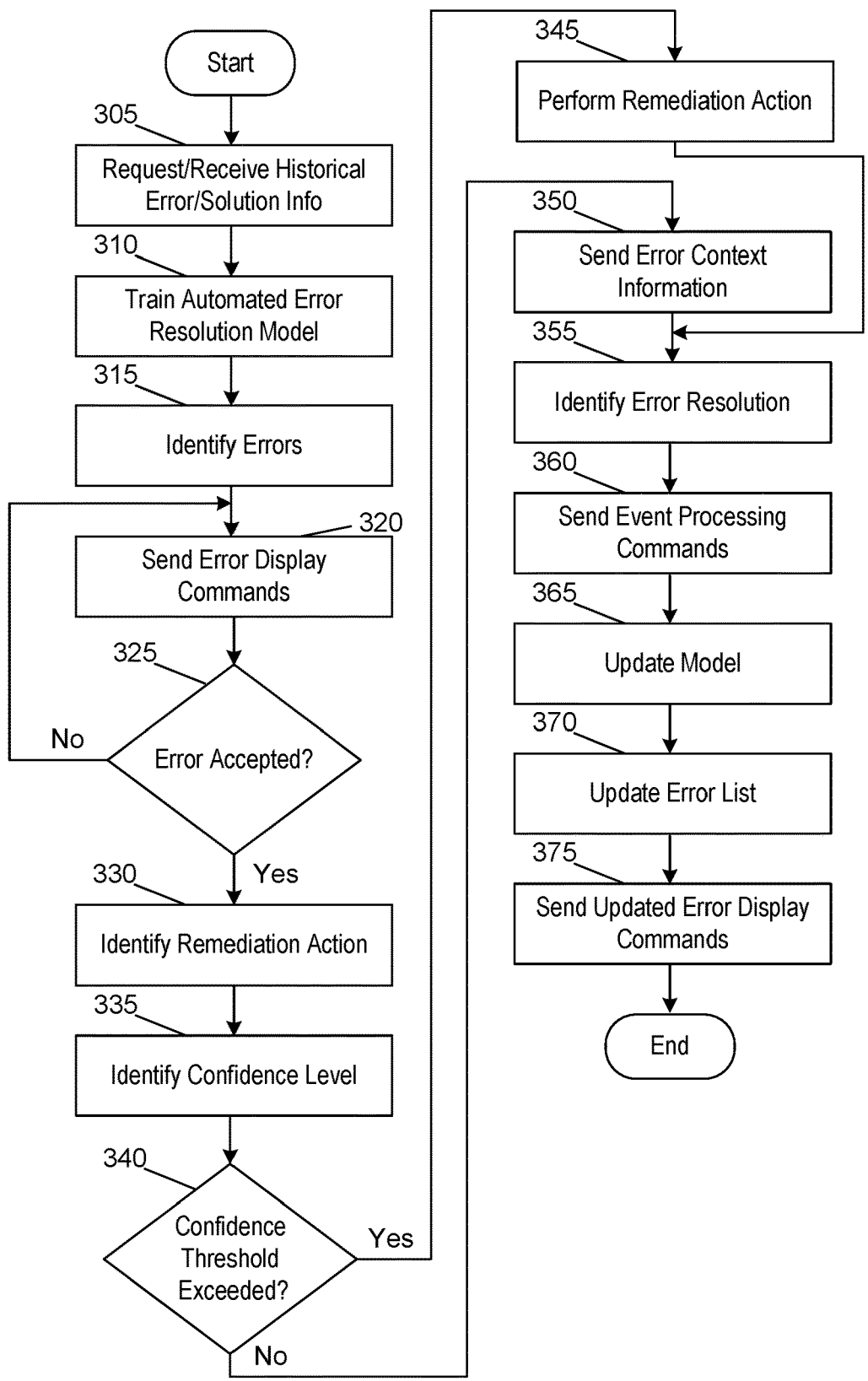
FIG. 3 depicts an illustrative method that implements an artificial intelligence engine for automated error resolution in accordance with one or more example embodiments.

FIG. 3 depicts an illustrative method that implements an artificial intelligence engine for automated error resolution in accordance with one or more example embodiments. Referring to FIG. 3, at step 305, a computing platform having at least one processor, a communication interface, and memory may request and receive historical error/solution information. At step 310, the computing platform may train an automated error resolution model using the historical error/solution information. At step 315, the computing platform may identify one or more errors for a customer. At step 320, the computing platform may send one or more commands directing a client device to display an error list that includes the one or more errors. At step 325, the computing platform may identify whether or not an error on the error list was accepted for remediation. If not, the computing platform may return to step 320. If an error was accepted, the computing platform may proceed to step 330.

At step 330, the computing platform may identify a remediation action using the automated error resolution model. At step 335, the computing platform may identify a confidence level corresponding to the remediation action. At step 340, the computing platform may identify whether the confidence level meets or exceeds a confidence threshold. If so, the computing platform may proceed to step 345. At step 345, the computing platform may perform the remediation action identified.

Returning to step 340, if the computing platform identifies that the confidence level does not meet or exceed the confidence threshold, the computing platform may proceed to step 350. At step 350, the computing platform may send error context information to an enterprise user device to facilitate remediation of the error. At step 355, the computing platform may identify that the error has been resolved. At step 360, the computing platform may send one or more event processing commands directing an event processing platform to process an event associated with the resolved error. At step 365, the computing platform may update the automated error resolution model. At step 370, the computing platform may update the error list to remove the resolved error. At step 375, the computing platform may send commands directing the client device to display the updated error list.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   at least one processor;
   a communication interface communicatively coupled to the at least one processor; and
   memory storing computer-readable instructions that, when executed by the at least one processor, cause the computing platform to:
      receive historical error and solution information;
      train, using the historical error and solution information, an artificial intelligence engine, wherein training the artificial intelligence engine enables it to automatically identify solutions for current errors for a plurality of users;
      identify one or more current errors for a user of the plurality of users; notify the user of the one or more current errors;
      receive a request to correct an error of the one or more current errors;
      identify, using the artificial intelligence engine, a solution to the error, wherein identifying the solution comprises automatically identifying the solution using the artificial intelligence engine, and wherein identifying the solution further comprises:
         generating, using the artificial intelligence engine, a confidence score corresponding to the automatically identified solution,
         based on identifying that the confidence score exceeds a first threshold, automatically performing one or more actions to achieve the solution,
         based on identifying that the confidence score exceeds a second threshold but not the first threshold, sending a notification of the one or more actions for approval by the user, and
         based on identifying that the confidence score does not exceed the second threshold, routing the error to an enterprise computing device for further assistance;
      send, after performing the one or more actions, one or more commands directing an event processing system to process an event with which the error was associated, wherein sending the one or more commands directing the event processing system to process the event causes the event processing system to process the event; and
      update, by feeding the identified one or more current errors and the automatically identified solution into the artificial intelligence engine, the artificial intelligence engine, wherein updating the artificial intelligence engine increases accuracy of the artificial intelligence engine in automatically identifying solutions to various errors.

2. The computing platform of claim 1, wherein the historical error and solution information comprises information indicating technical problems experienced during interaction with a mobile application or online portal.

3. The computing platform of claim 1, wherein identifying the one or more current errors for the user comprises receiving a user input indicating the one or more current errors.

4. The computing platform of claim 1, wherein identifying the one or more current errors for the user comprises identifying, automatically and without receiving a user input from the user indicating the one or more current errors, the one or more current errors.

5. The computing platform of claim 1, wherein notifying the user of the one or more errors comprises sending an out of band notification to the user indicating the one or more current errors.

6. The computing platform of claim 1, wherein notifying the user of the one or more errors comprises:
   receiving a log in request from the user to access an account; and
   displaying, along with a home page for the account, the one or more errors.

7. The computing platform of claim 1, wherein receiving the request to correct the error of the one or more current errors comprises:
   prompting the user to provide input indicating whether or not a most current error of the one or more current errors should be addressed; and
   receiving input indicating that the most current error should be addressed.

8. The computing platform of claim 1, wherein routing the error to the enterprise computing device further comprises:
   generating a report that includes the error and a list of mitigation steps performed.

9. The computing platform of claim 1, wherein the memory stores additional computer-readable instructions that, when executed by the at least one processor, cause the computing platform to:
   generate a list that includes the one or more current errors, wherein notifying the user of the one or more current errors comprises causing display of the list; and
   update, after achieving the solution for the error, the list to remove the error from the list of the one or more current errors.

10. A method comprising
    at a computing platform comprising at least one processor, a communication interface, and memory:
       receiving historical error and solution information;
       training, using the historical error and solution information, an artificial intelligence engine, wherein training the artificial intelligence engine enables it to automatically identify solutions for current errors for a plurality of users;
       identifying one or more current errors for a user of the plurality of users;
       notifying the user of the one or more current errors;
       receiving a request to correct an error of the one or more current errors;
       identifying, using the artificial intelligence engine, a solution to the error, wherein identifying the solution comprises automatically identifying the solution using the artificial intelligence engine, and wherein identifying the solution further comprises:
          generating, using the artificial intelligence engine, a confidence score corresponding to the automatically identified solution,
          based on identifying that the confidence score exceeds a first threshold, automatically performing one or more actions to achieve the solution,
          based on identifying that the confidence score exceeds a second threshold but not the first threshold, sending a notification of the one or more actions for approval by the user, and
          based on identifying that the confidence score does not exceed the second threshold, routing the error to an enterprise computing device for further assistance;

sending, after performing the one or more actions, one or more commands directing an event processing system to process an event with which the error was associated, wherein sending the one or more commands directing the event processing system to process the event causes the event processing system to process the event; and updating, by feeding the identified one or more current errors and the automatically identified solution into the artificial intelligence engine, the artificial intelligence engine, wherein updating the artificial intelligence engine increases accuracy of the artificial intelligence engine in automatically identifying solutions to various errors.

11. The method of claim 10, wherein the historical error and solution information comprises information indicating technical problems experienced during interaction with a mobile application or online portal.

12. The method of claim 10, wherein identifying the one or more current errors for the user comprises receiving a user input indicating the one or more current errors.

13. The method of claim 10, wherein identifying the one or more current errors for the user comprises identifying, automatically and without receiving a user input from the user indicating the one or more current errors, the one or more current errors.

14. The method of claim 10, wherein notifying the user of the one or more errors comprises sending an out of band notification to the user indicating the one or more current errors.

15. The method of claim 10, wherein notifying the user of the one or more errors comprises:
receiving a log in request from the user to access an account; and
display, along with a home page for the account, the one or more errors.

16. The method of claim 10, wherein receiving the request to correct the error of the one or more current errors comprises:
prompting the user to provide input indicating whether or not a most current error of the one or more current errors should be addressed; and
receiving input indicating that the most current error should be addressed.

17. The method of claim 10, wherein routing the error to the enterprise computing device further comprises:
generating a report that includes the error and a list of mitigation steps performed.

18. One or more non-transitory computer-readable media storing instructions that, when executed by a computing platform comprising at least one processor, a communication interface, and memory, cause the computing platform to:
receive historical error and solution information;
train, using the historical error and solution information, an artificial intelligence engine, wherein training the artificial intelligence engine enables it to automatically identify solutions for current errors for a plurality of users;
identify one or more current errors for a user of the plurality of users;
notify the user of the one or more current errors;
receive a request to correct an error of the one or more current errors;
identify, using the artificial intelligence engine, a solution to the error, wherein identifying the solution comprises automatically identifying the solution using the artificial intelligence engine, and wherein identifying the solution further comprises:
generating, using the artificial intelligence engine, a confidence score corresponding to the automatically identified solution,
based on identifying that the confidence score exceeds a first threshold, automatically performing one or more actions to achieve the solution,
based on identifying that the confidence score exceeds a second threshold but not the first threshold, sending a notification of the one or more actions for approval by the user, and
based on identifying that the confidence score does not exceed the second threshold, routing the error to an enterprise computing device for further assistance;
send, after performing the one or more actions, one or more commands directing an event processing system to process an event with which the error was associated, wherein sending the one or more commands directing the event processing system to process the event causes the event processing system to process the event; and
update, by feeding the identified one or more current errors and the automatically identified solution into the artificial intelligence engine, the artificial intelligence engine, wherein updating the artificial intelligence engine increases accuracy of the artificial intelligence engine in automatically identifying solutions to various errors.

\* \* \* \* \*

UNITED STATES PATENT AND TRADEMARK OFFICE
CERTIFICATE OF CORRECTION

PATENT NO. : 11,886,281 B2  
APPLICATION NO. : 17/401485  
DATED : January 30, 2024  
INVENTOR(S) : Prashanth Kolar et al.

Page 1 of 1

It is certified that error appears in the above-identified patent and that said Letters Patent is hereby corrected as shown below:

In the Claims

Column 13, Claim 1, Line 21:  
After "users;", insert --¶--

Column 14, Claim 10, Line 36:  
After "comprising", insert --:--

Signed and Sealed this  
Tenth Day of June, 2025

Coke Morgan Stewart  
*Acting Director of the United States Patent and Trademark Office*